(12) United States Patent
Yan

(10) Patent No.: US 6,789,063 B1
(45) Date of Patent: Sep. 7, 2004

(54) ACOUSTIC MODELING USING A TWO-LEVEL DECISION TREE IN A SPEECH RECOGNITION SYSTEM

(75) Inventor: Yonghong Yan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 09/653,402

(22) Filed: Sep. 1, 2000

(51) Int. Cl.$^7$ ............................................ G10L 15/06
(52) U.S. Cl. ..................................... 704/250; 704/256
(58) Field of Search ................................ 704/232, 242, 704/243, 245, 250, 256

(56) References Cited

U.S. PATENT DOCUMENTS

| | | | | |
|---|---|---|---|---|
| 5,657,424 | A | * | 8/1997 | Farrell et al. ................ 704/256 |
| 5,857,169 | A | * | 1/1999 | Seide .......................... 704/256 |
| 6,192,353 | B1 | * | 2/2001 | Assaleh et al. ............. 704/232 |
| 6,317,712 | B1 | * | 11/2001 | Kao et al. .................... 704/256 |

OTHER PUBLICATIONS

Chien et al. "compact decision trees with clsuter validity for speech recognition" IEEE 2002, PP 873–876.*

Kuhn et al. "improved decision tree for phonetic modeling" 1995 IEEE, pp 552–555.*

6th European Conference on Speech Communication and Technology, Eurospeech '99, Sep. 5–9, 1999, Budapest, Hungary, pp. 1–2.

<telecom.tuc.gr/paperdb/eurospeech99/HTML/First.HTM>, retrieved from WWW on Aug. 7, 2003.

S.J. Young et al., "Tree–Based State Tying for High Accuracy Acoustic Modelling," ARPA Human Language Technology Workshop, pp. 307–312, 1994.

C. Liu et al., "High Accuracy Acoustic Modeling Using Two–Level Decision-Tree Based–Tying," Proceedings of 6th European Confrence on Speech Communications and Technology (EuroSpeech), vol. 4, pp. 1703–1706, 1999.

* cited by examiner

Primary Examiner—Daniel Abebe
(74) Attorney, Agent, or Firm—Blakely, Sokoloff, Taylor & Zafman LLP

(57) ABSTRACT

In some embodiments, the invention involves receiving phonetic samples and assembling a two-level phonetic decision tree structure using the phonetic samples. The decision tree has multiple leaf node levels each having at least one state, wherein a least one node in a second level is assigned a Gaussian of a node in the first level, but the at least one node in the second level has a weight computed for it.

21 Claims, 2 Drawing Sheets

ACOUSTIC MODELING USING A TWO-LEVEL DECISION TREE IN A SPEECH RECOGNITION SYSTEM

BACKGROUND OF THE INVENTION

1. Technical Field of the Invention

The present invention relates to speech recognition and, more particularly, to a speech recognition system with a two-level decision tree.

2. Background Art

In large vocabulary continuous speech recognition systems, context-dependent phones, typically triphones, and continuous density HMM models are often used to get high accuracy acoustic models. The huge number of triphones and multivariate Gaussian mixture distributions results in too many parameters in a system. It is a problem to maintain a good balance between the model complexity and the number of parameters that can be robustly estimated from the limited training data. The use of phonetic decision trees provides a good solution to this problem. It has two advantages over the bottom-up based approaches. First, by incorporating the phonetic knowledge of the target language into the tree, it can synthesize unseen models or contexts, which do not appear in the training data but occur during recognition. Second, the splitting procedure of decision trees provides a way of maintaining the model complexity and the number of parameters to be robustly estimated.

A phonetic decision tree is a type of classification and regression tree (CART). In decision-tree based acoustic modeling, phonetic decision trees are constructed either for each phone model or for each HMM state of each phone. Since the state-based approach provides a more detailed level of sharing and outperforms the model-based approach, the state-based approach is widely used. The phonetic decision tree is a binary tree in which a yes-no question about the phonetic context is attached to each node. An example question is "Is the phone on the right of the current phone a vowel?" A set of states can be recursively partitioned into subsets according to the answers to the questions at each node when traversing the tree from the root node to its leaf nodes. All states that reach the same leaf nodes are considered similar and are clustered together. The question set can be either manually pre-defined using linguistic and phonetic knowledge of the language, or automatically generated.

The tree construction is a top-down data driven process based on a one-step greedy tree growing algorithm. The goodness-of-split criterion is based on maximum likelihood (ML) of the training data. Initially all corresponding HMM states of all triphones that share the same basic phone are pooled in the root node and the log-likelihood of the training data is calculated based on the assumption that all the states in the node are tied. This node is then split into two by the question that gives the maximum increase in log-likelihood of the training data when partitioning the states in the node. This process is repeated until the increase falls below a threshold. To ensure that each leaf node has sufficient training data to robustly estimate the state, a minimum data count for the leaf node is also applied.

Although the traditional method provides an effective and efficient way to build a decision tree for continuous density HMM models based on the maximum likelihood criterion, it has several problems. One is due to the assumption that the parametric form of the initial unclustered states should be based on only single mixture Gaussian distributions. After the tree is built, the clustered states have more training data and the number of Gaussian components in each state is increased by a mixture-splitting procedure until the performance of the model set peaks on a development set. The use of single Gaussian distributions during tree construction is due to the fact that the multiple mixture Gaussian distribution for a tree node needs to be re-estimated from the training data, whereas the parameters of the single mixture Gaussian distribution can be calculated efficiently from the cluster members without re-accessing the original training data. However, the single Gaussian distribution is a very crude representation of the acoustic space of each state and decision trees based on such initial models may not give good clustering of states. There are many efforts to address this problem. Another approach incorporates a so-called m-level optimal subtree into the traditional tree construction to get a multiple mixture Gaussian distribution parameterization of each node although each member state still has only single Gaussian distribution as in the traditional approach. Another approach directly estimates, by making some assumptions, the multiple mixture Gaussian distribution for a tree node from the statistics of the member states which also have multiple mixture Gaussian distributions. Both of their approaches achieve some improvement. Yet another approach estimates the multiple mixture Gaussian distributions of the un-clustered states by using the fixed state alignment provided by a previously trained and accurate model set. However, this approach has not been shown to give any improvement in terms of performance. Another problem with the standard tree-building process is due to the fact that construction of an optimal tree is an NP-hard problem. Instead, a sub-optimal one-step greedy algorithm is utilized. To make better decisions at each node split, look-ahead search may be used, yet no improvement is obtained. Many efforts address other aspects of the traditional decision-tree based state-clustering approach, such as applying other goodness-of-split criteria, using cross-validation to automatically determine the size of the trees by pruning back instead of using thresholds which have to be determined by many experiments, and expanding the question set to incorporate more knowledge of the language.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The present invention involves a new structure called a two-level decision tree to improve the decision-tree based acoustic modeling. It is based on the traditional decision-tree approach and is built with the same goodness-of-split criterion. By decoupling the Gaussian pool and the corresponding mixture weights using the two-level decision tree structure, better use can be made of training data and thereby improve the accuracy and robustness of the clustered acoustic models. Experimental results on large vocabulary continuous speech recognition tasks show the effectiveness of this new approach.

During the decision tree construction, if all the data associated with all the states in a node is less than a threshold, the node is no longer split and becomes a leaf node. This is to ensure that all the states in the node can be robustly estimated, since too little data will not be statistically representative enough and models estimated on it will over-fit the data and generalize poorly, causing performance loss. In practice, the threshold is determined by experiments. However, this data-count thresholding will cause problems. Some states, particularly those states of rarely-seen triphones which have very few training data, are clustered together not because they are acoustically very similar, but because they do not have enough training data. This can be a cause of performance degradation. In the traditional decision-tree based approach, all the Gaussian components and the corresponding weights are shared across all the member states in the same leaf node, and no distinctions are provided among those states clustered together. This assumption restricts the improvement of the model accuracy. The invention involves a new structure (based on the traditional decision tree), called a two-level decision tree to address this problem.

Figure 1:
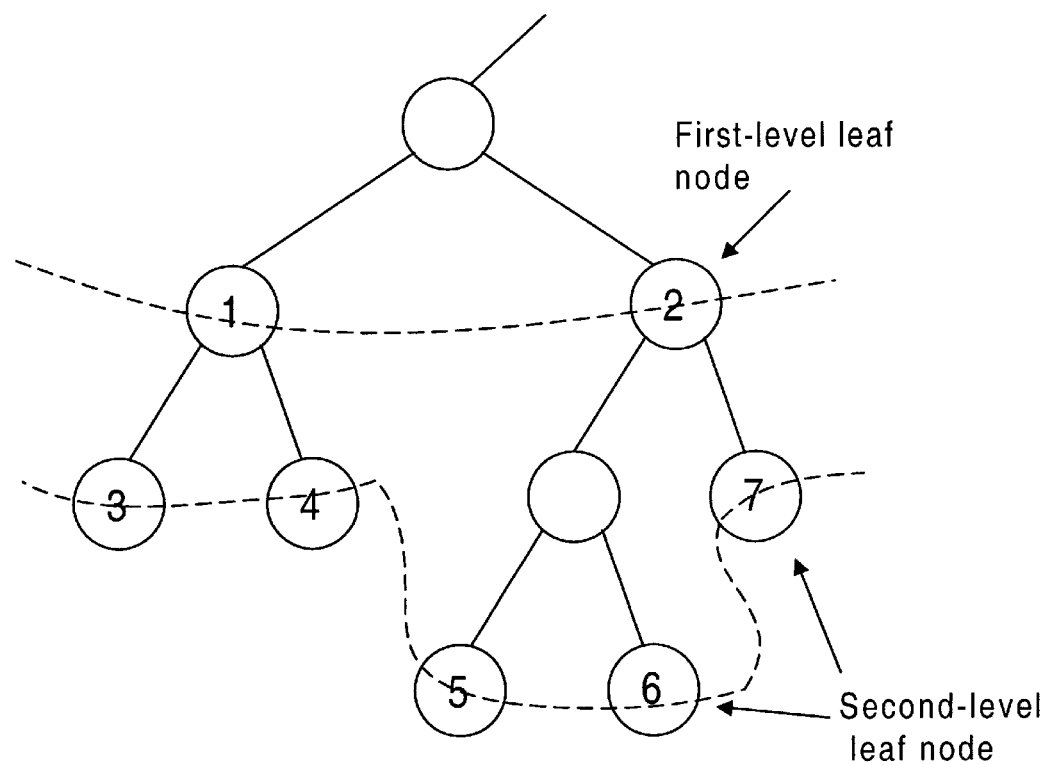
FIG. 1 illustrates a two-level decision tree which visually represents certain aspects of some embodiments of the invention.

FIG. 1 illustrates the two-level decision tree structure, wherein the tree has multiple stages. Essentially, it is still a regular phonetic decision tree. The difference is that it has two levels (here level means the type of leaf nodes). In the first-level (called Gaussian-sharing level) tree, all the states in the same leaf node share the same Gaussian pool. The nodes of the second-level (called weight-sharing level) tree, are obtained by further splitting the first-level leaf nodes using the same method. All the second-level leaf nodes that come from the same first-level leaf node will share the same Gaussian pool, but they have their own set of weights for the Gaussians. All the states in the same second-level leaf node will share their mixture weights. For example, in FIG. 1, nodes 3 and 4 share the Gaussian pool in node 1. Nodes 5, 6, and 7 share the Gaussian pool in node 2.

If first-level leaf nodes are not expanded, the tree is the same as a traditional decision tree (for contrast, refer to as a one-level tree), in which all states in the same leaf node share not only Gaussians but also corresponding mixture weights. By using the second-level nodes, better resolution can be achieved among those states in the same first-level leaf node by distinguishing their mixture weights, especially for those rarely-seen triphones states that have to be clustered together due to the minimum count thresholding. By controlling the number of the second-level nodes, the increased number of mixture weights adds only a very small percentage of parameters. For example, in some embodiments, if each first-level leaf node is split into only two second-level nodes, the two-level tree only adds about 1/79 of the number of parameters (assuming the speech feature vector has 39 elements and the covariance matrix of each Gaussian is diagonal).

The increased number of mixture weights still can be robustly estimated since estimating mixture weights requires very few training data given a robustly estimated Gaussian pool in the first-level leaf node. (Actually they are estimated jointly to get optimal values.) By decoupling Gaussians and corresponding weights in the traditional decision tree and creating a two-level tree structure, better use can be made of training data, especially for those rarely seen triphones. From this point of view, the proposed structure is similar to the tied-mixture or semi-continuous HMM and thus has the similar advantage over the one-level decision-tree based acoustic modeling. But tied-mixture HMMs only have one global set of Gaussians that are shared by all the states in all models. Here two-level decision-tree structure gives a much finer level of sharing. So far, there has been an implicit assumption that two-level trees are built by expanding the optimal one-level trees and thereby the two-level tree based acoustic models have more parameters than the one-level tree based models. However, this is not necessary. In practice, tuning the balance of the first-level and second-level leaf nodes may provide better performance with even fewer parameters than an optimal one-level tree system.

Normally a global threshold of data count is used for all the trees and the value is tuned until the final state-clustered model set based on the decision tree achieves best performance on a development set. Even with this global optimal value, it is still possible that some leaf nodes are under-trained and should be further split to get higher resolution and some leaf nodes are over-trained and should be pruned back (although this problem is lessened by allowing a variable number of Gaussian components in the final model set). This problem can be lessened in the two-level decision tree structure since it provides more flexibility to control the total number of parameters. By using relatively conservative value of data count threshold in the first-level (Gaussian-sharing level) tree, the Gaussian pools in all of the leaf nodes may be robustly estimated. And by using the second-level (weight-sharing level) nodes, high resolutions may be achieved. Although a global data count threshold (smaller than the one used in the first-level tree) is still used, the impact of this problem is smaller since it only affects the mixture weights.

It is noted that the invention is not restricted to the particular implementation details described herein.

Figure 2:
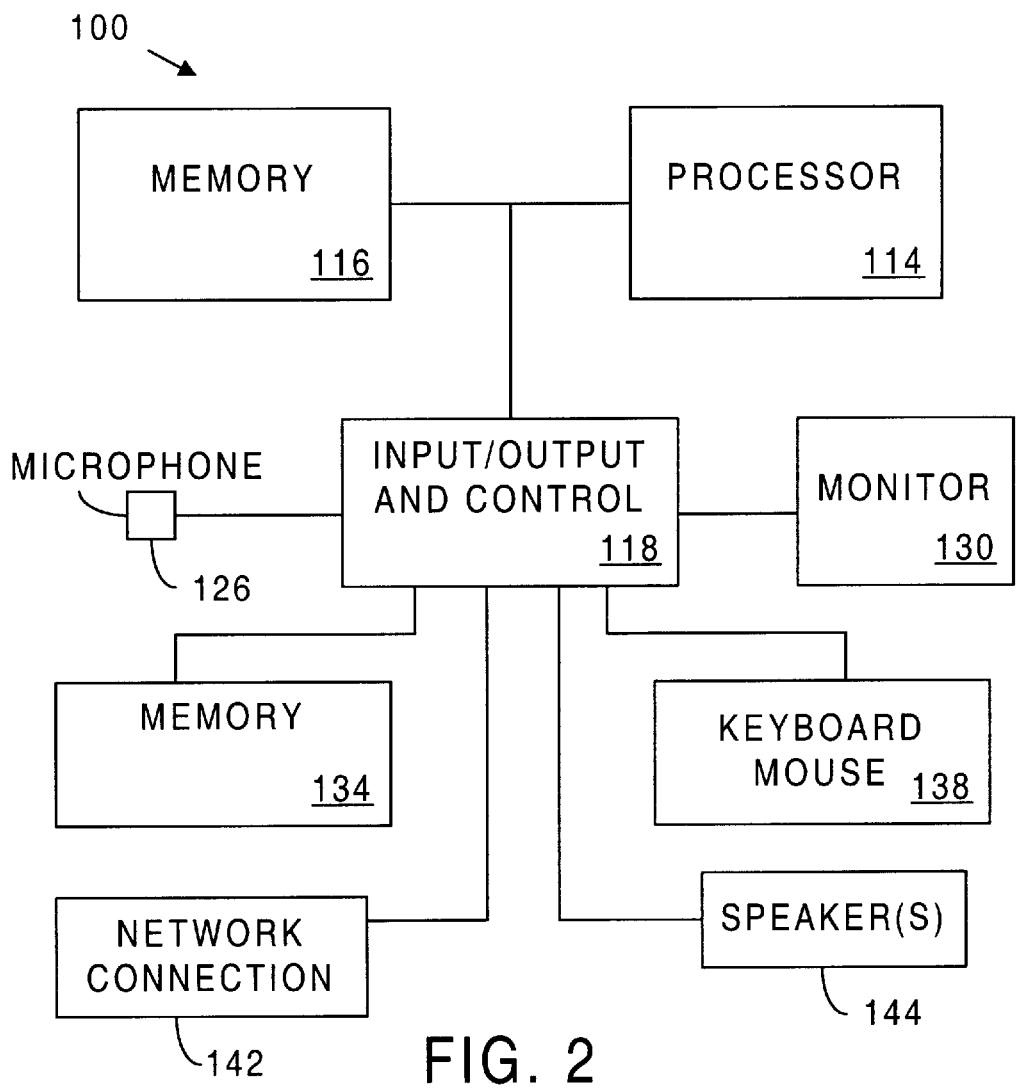
FIG. 2 is a high level schematic block diagram representation of a computer system that may be used in connection with some embodiments of the invention.

There are a variety of computer systems that may be used in training and for speech recognition system. Merely as an example, FIG. 2 illustrates a highly schematic representation of a computer system 100 which includes a processor 114, memory 116, and input/output and control block 118. There may be a substantially amount of memory in processor 114 and memory 116 may represent both memory that is off the chip of processor 114 or memory that is partially on and partially off the chip of processor 114. (Or memory 116 could be completely on the chip of processor 114). At least some of the input/output and control block 118 could be on the same chip as processor 114, or be on a separate chip. A microphone 126, monitor 130, additional memory 134, and input devices (such as a keyboard and mouse 138), a network connection 142, and speaker(s) 144 may interface with input/output and control block 118. Memory 134 represents a variety of memory such as a hard drive and CD ROM or DVD discs. These memories are examples of articles including computer readable storage media that can hold instructions to be executed causing some embodiments of the invention to occur. It is emphasized that FIG. 2 is merely exemplary and the invention is not limited to use with such a computer system. Computer system 110 and other computer systems used to carry out the invention may be in a variety of forms, such as desktop, mainframe, and portable computers.

Figure 3:
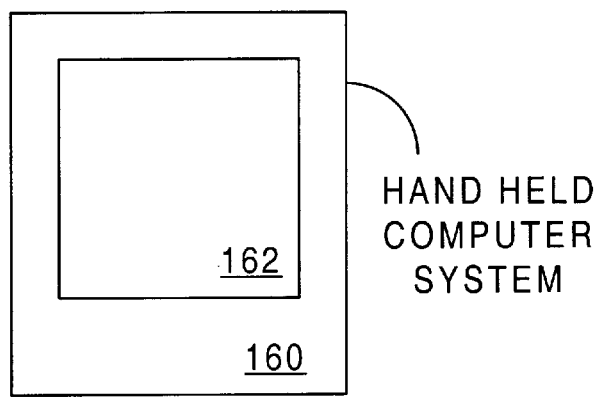
FIG. 3 is a high level schematic representation of a hand-held computer system that may be used in connection with some embodiments of the invention.

For example, FIG. 3 illustrates a handheld device 160, with a display 162, which may incorporate some or all the features of FIG. 2. The hand held device may at times interface with another computer system, such as that of FIG. 2. The shapes and relative sizes of the objects in FIGS. 2 and 3 are not intended to suggest actual shapes and relative sizes.

The present invention may be implemented accordingly to various well known techniques or through techniques currently not known.

Although the discussion describes the invention in terms of a two-level decision tree it could be a more than two-level (e.g., three level) decision tree (called a multi-level decision tree) in which lower levels have the weights of higher levels, but their own Gaussian computations.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method comprising:
   receiving acoustic samples; and
   assembling a two-level decision tree structure using the acoustic samples, wherein the two-level decision tree structure comprises at least two leaf node levels each having at least one state, and all the states in the same leaf node share a Gaussian pool.

2. The method of claim 1, wherein all second-level leaf nodes that derive from a first-level leaf node will share a same Gaussian pool, but each of these second-level leaf nodes has its own set of weights for each Gaussian component in the same Gaussian pool.

3. The method of claim 1, wherein second-level leaf nodes are obtained by splitting first-level leaf nodes.

4. The method of claim 1, wherein the Gaussian pool comprises at least one Gaussian component, each Gaussian component represents a Gaussian distribution.

5. A method comprising:
   receiving acoustic samples; and
   assembling a two-level decision tree structure using the acoustic samples, wherein the two-level decision tree structure comprises at least two leaf node levels each having at least one state, wherein at least one node in a second leaf node level is assigned a Gaussian component of a node in a first leaf node level, but the at least one node in the second level has at least one weight computed for it.

6. A The method of claim 5, wherein all second-level leaf nodes that derive_from a first-level leaf node will share a same Gaussian pool, but each of these second-level leaf nodes has its own set of weights for each Gaussian component in the same Gaussian pool.

7. The method of claim 5, wherein second-level leaf nodes are obtained by splitting first-level leaf nodes.

8. The method of claim 5, wherein the Gaussian pool comprises at least one Gaussian component, each Gaussian component represents a Gaussian distribution.

9. An article comprising:
   a storage medium to hold instructions which when executed cause a computer to performing the following method:
   receiving acoustic samples; and
   assembling a two-level decision tree structure using the acoustic samples, wherein the two-level decision tree structure comprises at least two leaf node levels each having at least one state, and all the states in the same leaf node share a Gaussian pool.

10. The article of claim 9, wherein all second-level leaf nodes that derive from a first-level leaf node will share a same Gaussian pool, but each of these second-level leaf nodes has its own set of weights for each Gaussian component in the same Gaussian pool.

11. The article of claim 9, wherein second-level leaf nodes are obtained by splitting first-level leaf nodes.

12. The article of claim 9, wherein the Gaussian pool comprises at least one Gaussian component, each Gaussian component represents a Gaussian distribution.

13. An article comprising:
    a storage medium to hold instructions which when executed cause a computer to performing the following method:
    receiving acoustic samples; and
    assembling a two-level decision tree structure using the acoustic samples, wherein the two-level decision tree structure comprises at least two leaf node levels each having at least one state, wherein at least one node in a second leaf node level is assigned a Gaussian component of a node in a first leaf node level, but the at least one node in the second level has at least one weight computed for it.

14. The article of claim 13, wherein all second-level leaf nodes that derive from a first-level leaf node will share a same Gaussian pool, but each of these second-level leaf nodes has its own set of weights for each Gaussian component in the same Gaussian pool.

15. The article of claim 13, wherein second-level leaf nodes are obtained by splitting first-level leaf nodes.

16. The article of claim 13, wherein the Gaussian pool comprises at least one Gaussian component, each Gaussian component represents a Gaussian distribution.

17. A two-level decision tree structure, comprising:
    a plurality of first-level leaf nodes, wherein each first-level leaf node associates with a Gaussian pool; and
    a plurality of second-level leaf nodes, wherein all second-level leaf nodes that derive from a first-level leaf node share a same Gaussian pool with the first-level leaf node, but each of these second-level leaf nodes has its own set of weights for each Gaussian component in the same Gaussian pool.

18. The structure of claim 17, wherein the Gaussian pool comprises at least one Gaussian component, each Gaussian component represents a Gaussian distribution.

19. The structure of claim 17, wherein second-level leaf nodes are obtained by splitting first-level leaf nodes.

20. The structure of claim 17, wherein a first-level leaf node comprises at least one state, and all states in the first-level leaf node share a Gaussian pool.

21. The structure of claim 17, wherein a second-level leaf node comprises at least one state, and all states in the second-level leaf node share a Gaussian pool and a set of weights for each Gaussian component in the Gaussian pool.

* * * * *

UNITED STATES PATENT AND TRADEMARK OFFICE
CERTIFICATE OF CORRECTION

PATENT NO. : 6,789,063 B1 Page 1 of 1
DATED : September 7, 2004
INVENTOR(S) : Yan It is certified that error appears in the above-identified patent and that said Letters Patent is hereby corrected as shown below:

<u>Column 6,</u>
Line 58, at the beginning delete "A".

Signed and Sealed this

Twenty-first Day of June, 2005

JON W. DUDAS
*Director of the United States Patent and Trademark Office*